(No Model.)

W. A. HENDERSON.
PROCESS OF SOLDERING METAL PIPES.

No. 407,778. Patented July 30, 1889.

WITNESSES.
Pennington Halsted
H. Selden Loving

INVENTOR
William A. Henderson
by Chas M. Reed
Attorney

UNITED STATES PATENT OFFICE.

WILLIAM A. HENDERSON, OF MALDEN, MASSACHUSETTS.

PROCESS OF SOLDERING METAL PIPES.

SPECIFICATION forming part of Letters Patent No. 407,778, dated July 30, 1889.

Application filed May 31, 1889. Serial No. 312,692. (No model.)

*To all whom it may concern:*

Be it known that I, WILLIAM A. HENDERSON, a citizen of the United States, residing at Malden, in the county of Middlesex and State of Massachusetts, have invented a new and useful Process of Soldering Metal Pipes, of which the following is a specification, reference being had to the accompanying drawings.

My invention relates to an improved method of soldering the joints of metal pipes; and it consists in interposing a ring of solder between the ends of the pipes to be joined, and there melting it by the application of heat, the molten metal being retained between the ends of the pipes by a suitable mold, leaving a joint of practically the same diameter both external and internal as the rest of the pipe, substantially as hereinafter set forth. My said process is especially applicable to pipes of lead and other soft metals used in plumbing.

The apparatus described in Letters Patent No. 396,654, granted to me January 22, 1889, may be employed in carrying my process into effect; or any similar apparatus may be used by which the ends of the pipes are inclosed in a mold and the solder retained in place during the soldering process.

Figure 1:
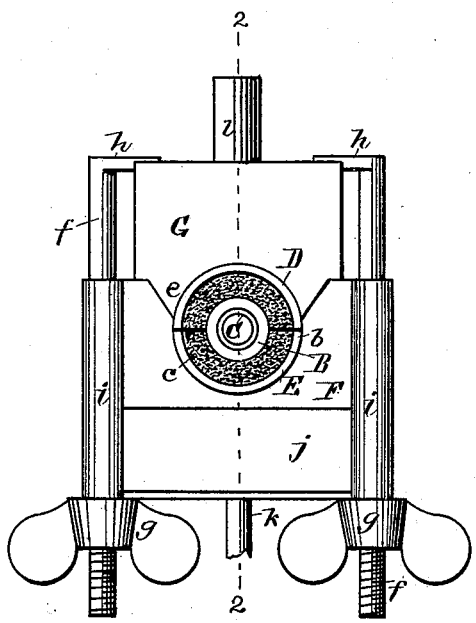
Figure 2:
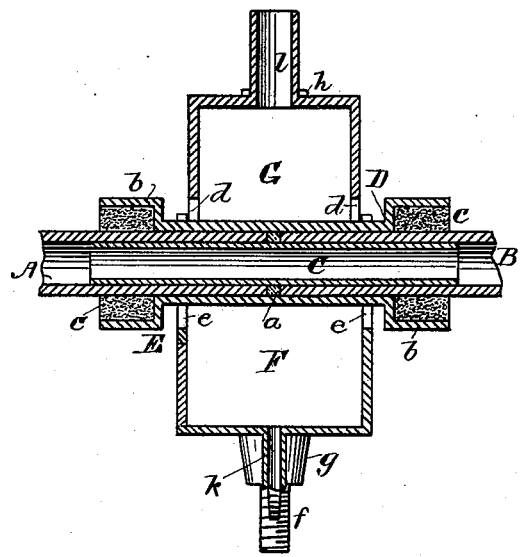
Figure 3:
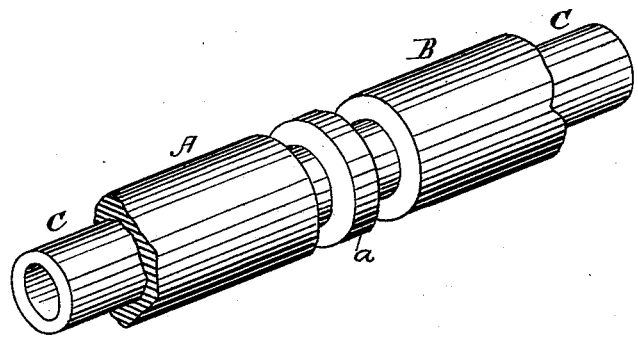

In the accompanying drawings, Figure 1 is a front view of the apparatus above referred to. Fig. 2 is a central vertical section of the same, taken on the line 2 2 in Fig. 1. Fig. 3 is a perspective view of the pipes, showing the lining-tube and the solder-ring, the pipes being slightly separated.

A and B represent two metal pipes the ends of which are to be soldered together. These ends are preferably faced off, so as to be nearly parallel with each other, thereby reducing the amount of solder to be used and producing a stronger joint.

A narrow ring of solder $a$, with a suitable flux, is placed between the ends of the pipes and a short tube C inserted in the ring and within the pipes, closely fitting the inside of the latter and covering the joints between the solder ring and the ends of the pipes, the object of said tube being to prevent the solder, when melted, from flowing into the pipes.

The tube C may be of thin metal, as brass or copper, in which case it will remain permanently within the joint; but I prefer to make it of paper, so that it may afterward be reduced to pulp and washed away by the action of water or other liquid flowing through the pipe, leaving the interior diameter of the pipe undiminished at the joint.

The pipes A B, with the ring of solder between them, after being brought together as closely as possible, are placed in a metal mold or casing D E, divided longitudinally into two parts, so as to be readily opened for the insertion of the pipes, and for their removal after the operation of soldering is completed.

The casing D E is made to fit closely the outside of the pipes, so that the solder in the joint is held between it and the lining-tube C. The casing D E has flaring ends $b$ $b$, so as to leave at each end a space $c$ between the casing and the pipes, which spaces $c$ $c$, I prefer to fill with asbestus or other material which is a non-conductor of heat, thereby preventing that portion of the pipes outside of the casing from being overheated. Heat is then applied to the outside of the casing either by the flame of gas or other suitable means until the solder is melted. While the solder is in a state of fusion the ends of the pipes are forced toward each other slightly, thereby compressing the solder until it completely fills the space between the ends of the pipes, the inner tube C, and the outer casing D E. After cooling, the pipes are removed from the casing D E, the result being a joint in which the pipes are united to each other by a thin ring of solder, the joint being of substantially the same diameter internal and external as the pipes themselves.

Instead of using a gas-jet to melt the solder, heat may be applied by any other convenient means. A device which I have found useful for that purpose is shown in the accompanying drawings. Said device is in the form of a box having a lower part F and an upper part G to slide vertically therein. Each of these parts has notches of a tapering form— one in each of the opposite sides of the upper part and one in each of the corresponding sides of the lower part. The casing D E rests in the notches of the lower part, while the upper part shuts over it, thereby inclosing the part of the casing containing the pipe within the box. By means of bolts $f$—one in each side of the box—and nuts $j\,j$ thereon, the parts of the box may be drawn together, the heads $h\,h$ of the bolts bearing against the top of the part G and the nuts against the under sides of the part F. The bolts are held in place and slide in tubular guides $i\,i$ at the opposite sides of the part F. By means of these bolts and the two parts of the box the parts of the casing D E are clamped closely together and upon the pipes A B. There is a door $j$ for the admission of coals into the lower part E. Air may then be forced through the tube $k$, and the gases of combustion pass out of the box at the tube C.

I make no claim in this application to the specific mechanism above described.

What I claim, and desire to secure by Letters Patent, is—

The process of soldering together the ends of soft-metal pipes by placing them end to end, with a narrow ring of solder between them, over a short piece of lining-pipe, inclosing the joint thus formed in a closely-fitting metal casing, melting the solder by the application of heat through the casing, and compressing the melted solder by forcing the ends of the pipes toward each other, substantially as and for the purpose described.

WILLIAM A. HENDERSON.

Witnesses:
PENNINGTON HALSTED,
CHAS. M. REED.